(12) United States Patent
Chishti

(10) Patent No.: US 12,120,268 B2
(45) Date of Patent: Oct. 15, 2024

(54) TECHNIQUES FOR BENCHMARKING PERFORMANCE IN A CONTACT CENTER SYSTEM

(71) Applicant: Afiniti, Ltd., Hamilton (BM)

(72) Inventor: Zia Chishti, Washington, DC (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 18/197,482

(22) Filed: May 15, 2023

(65) Prior Publication Data

US 2023/0283717 A1    Sep. 7, 2023

Related U.S. Application Data

(63) Continuation of application No. 17/745,217, filed on May 16, 2022, now Pat. No. 11,695,872, which is a
(Continued)

(51) Int. Cl.
*H04M 3/00* (2024.01)
*G06Q 10/06* (2023.01)
(Continued)

(52) U.S. Cl.
CPC .......... *H04M 3/5175* (2013.01); *G06Q 10/06* (2013.01); *G06Q 10/06393* (2013.01);
(Continued)

(58) Field of Classification Search
CPC ............ H04M 3/5175; H04M 3/5233; H04M 2203/401; H04M 3/5166;
(Continued)

(56) References Cited

U.S. PATENT DOCUMENTS 5,155,763 A    10/1992    Bigus et al.
5,206,903 A    4/1993    Kohler et al.
(Continued)

FOREIGN PATENT DOCUMENTS

AU    2008349500 C1    5/2014
AU    2009209317 B2    5/2014
(Continued)

OTHER PUBLICATIONS

Afiniti, "Afiniti® Enterprise Behavioral Pairing ™ Improves Contact Center Performance," White Paper, retreived online from URL: <http://www.afinitit,com/wp-content/uploads/2016/04/Afiniti_White-Paper_Web-Email.pdf> 11 pages (2016).
(Continued)

*Primary Examiner* — Kharye Pope
(74) *Attorney, Agent, or Firm* — Wilmer Cutler Pickering Hale and Dorr LLP

(57) ABSTRACT

Techniques for benchmarking performance in a contact center system are disclosed. In one particular embodiment, the techniques may be realized as a method for benchmarking contact center system performance comprising cycling, by at least one computer processor configured to perform contact center operations, between a first contact-agent pairing strategy and a second contact-agent pairing strategy for pairing contacts with agents in the contact center system; determining an agent-utilization bias in the first contact-agent pairing strategy comprising a difference between a first agent utilization of the first contact-agent pairing strategy and a balanced agent utilization; and determining a relative performance of the second contact-agent pairing strategy compared to the first contact-agent pairing strategy based on the agent-utilization bias in the first contact-agent pairing strategy.

20 Claims, 6 Drawing Sheets

Related U.S. Application Data continuation of application No. 17/525,468, filed on Nov. 12, 2021, now Pat. No. 11,363,142, which is a continuation of application No. 17/093,076, filed on Nov. 9, 2020, now Pat. No. 11,356,556, which is a continuation of application No. 16/198,419, filed on Nov. 21, 2018, now Pat. No. 10,834,259, which is a continuation of application No. 15/176,899, filed on Jun. 8, 2016, now Pat. No. 10,142,473.

(51) Int. Cl.
   *G06Q 10/0639*    (2023.01)
   *H04L 12/66*      (2006.01)
   *H04M 3/51*       (2006.01)
   *H04M 3/523*      (2006.01)
   *H04M 5/00*       (2006.01)

(52) U.S. Cl.
   CPC ....... *H04M 3/5191* (2013.01); *H04M 3/5233* (2013.01); *Y04S 10/50* (2013.01)

(58) Field of Classification Search
   CPC ........... H04M 2203/402; H04M 3/493; H04M 3/5232; H04M 3/5235; H04M 3/5191; H04M 3/5183; H04M 2203/408; H04M 2203/40; H04M 3/42059; G06Q 10/06393; G06Q 10/06398; G06Q 10/063112; G06Q 10/0639
   USPC ............ 379/265.06, 265.02, 265.12, 265.11, 379/265.01, 265.09; 705/7.39, 7.42, 7.38
   See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,590,188 A | 12/1996 | Crockett |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,639,982 B1 | 10/2003 | Stuart et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykir |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,811,597 B1 | 8/2014 | Hackbarth et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |

(56) References Cited

U.S. PATENT DOCUMENTS

| | | |
|---|---|---|
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,404,861 B2 | 9/2019 | Kan et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1* | 12/2002 | Kosiba ............ G06Q 10/06315 705/7.38 |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0202308 A1 | 10/2004 | Baggenstoss et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0173724 A1 | 8/2006 | Trefler et al. |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0256955 A1 | 11/2006 | Laughlin et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0112557 A1 | 5/2008 | Ricketts |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1* | 7/2008 | Bourne ............... H04M 3/5175 379/265.06 |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1* | 7/2009 | Xie ..................... H04M 3/5232 379/265.11 |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1* | 3/2010 | Afzal .................. H04M 3/5232 379/265.11 |
| 2010/0054453 A1 | 3/2010 | Stewart |
| 2010/0080120 A1 | 4/2010 | Bejerano et al. |
| 2010/0086120 A1* | 4/2010 | Brussat .............. H04M 3/5233 379/265.12 |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2010/0303225 A1* | 12/2010 | Shashkov .......... H04M 3/5175 379/265.11 |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0194684 A1 | 8/2011 | Ristock et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2012/0300920 A1 | 11/2012 | Fagundes et al. |
| 2013/0003959 A1 | 1/2013 | Nishikawa et al. |
| 2013/0136248 A1 | 5/2013 | Kaiser-Nyman et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0211933 A1 | 7/2014 | Vymenets et al. |
| 2014/0341370 A1* | 11/2014 | Li ..................... H04M 3/5232 379/265.14 |
| 2014/0355748 A1 | 12/2014 | Conway et al. |
| 2015/0055772 A1 | 2/2015 | Klemm et al. |

(56) References Cited

U.S. PATENT DOCUMENTS

| | | | |
|---|---|---|---|
| 2015/0071428 A1 | 3/2015 | Sobus et al. | |
| 2015/0131793 A1 | 5/2015 | Riefel | |
| 2015/0131915 A1 | 5/2015 | Lin et al. | |
| 2015/0178660 A1* | 6/2015 | Nowak | G06Q 10/06398 705/7.42 |
| 2015/0281448 A1 | 10/2015 | Putra et al. | |
| 2016/0036983 A1* | 2/2016 | Korolev | H04M 3/5233 379/265.12 |
| 2016/0080573 A1 | 3/2016 | Chishti | |
| 2016/0112568 A1 | 4/2016 | Nowak et al. | |
| 2017/0064080 A1 | 3/2017 | Chishti et al. | |
| 2017/0064081 A1 | 3/2017 | Chishti et al. | |
| 2017/0111509 A1* | 4/2017 | McGann | H04M 3/5238 |

FOREIGN PATENT DOCUMENTS

| | | |
|---|---|---|
| AU | 2009311534 B2 | 8/2014 |
| AU | 2015203175 A1 | 7/2015 |
| CN | 101645987 A | 2/2010 |
| CN | 102256023 A | 11/2011 |
| CN | 102301688 B | 5/2014 |
| CN | 102017591 B | 11/2014 |
| EP | 0493292 A2 | 7/1992 |
| EP | 0949793 A1 | 10/1999 |
| EP | 1032188 A1 | 8/2000 |
| EP | 1335572 A2 | 8/2003 |
| IN | 3636/MUM/2011 | 1/2013 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-507976 A | 3/2012 |
| JP | 5421928 B2 | 2/2014 |
| JP | 5631326 B2 | 11/2014 |
| JP | 5649575 B2 | 1/2015 |
| JP | 2015-514268 A | 5/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/17517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |

OTHER PUBLICATIONS

Anonymous. (2006) "Performance Based Routing in Profit Call Centers," The Decision Makers' Direct, located at www.decisioncraft.com, Issue Jun. 2002 (3 pages).

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, Dec. 1979, pp. 829-836 (8 pages).

Cormen, T. H., et al., "Introduction to Algorithms," 3rd Edition, Chapter 26 Maximum Flow, pp. 708-768 and Chapter 29 Linear Programming, pp. 843-897 (2009).

Extended European Search Report issued by the European Patent Office for European Application No. 18168620.5 dated Jun. 12, 2018 (9 pages).

Extended European Search Report issued by the European Patent Office for European Patent Application No. 17154781.3 dated May 4, 2017, (7 pages).

Extended European Search Report issued by the European Patent Office for European Patent Application No. 17171761.4 dated Aug. 30, 2017, (8 pages).

Gans, N. et al., "Telephone Call Centers: Tutorial, Review and Research Prospects," Manufacturing & Service Operations Management, vol. 5, No. 2, 2003, pp. 79-141, (84 pages).

International Preliminary Report on Patentability issued in connection with PCT Application No. PCT/US2009/066254 mailed Jun. 14, 2011 (6 pages).

International Search Report and Written Opinion issued by the European Patent Office as International Searching Authority for International Application No. PCT/IB2016/001762 dated Feb. 20, 2017 (15 pages).

International Search Report and Written Opinion issued by the European Patent Office as International Searching Authority for International Application No. PCT/IB2016/001776 dated Mar. 3, 2017 (16 pages).

International Search Report and Written Opinion issued by the European Patent Office as International Searching Authority for International Application No. PCT/IB2016/001871 dated Mar. 17, 2017 (13 pages).

International Search Report and Written Opinion issued by the European Patent Office as International Searching Authority for International Application No. PCT/IB2017/000570 dated Jun. 30, 2017 (13 pages).

International Search Report issued in connection with International Application No. PCT/US13/33268 mailed May 31, 2013 (2 pages).

International Search Report issued in connection with PCT Application No. PCT/US/2009/054352 mailed Mar. 12, 2010, 5 pages.

International Search Report issued in connection with PCT Application No. PCT/US2008/077042 mailed Mar. 13, 2009 (3 pages).

International Search Report issued in connection with PCT Application No. PCT/US2009/031611 mailed Jun. 3, 2009 (5 pages).

International Search Report issued in connection with PCT Application No. PCT/US2009/066254 mailed Feb. 24, 2010 (4 pages).

International Search Report issued in connection with PCT/US2009/061537 mailed Jun. 7, 2010 (5 pages).

International Search Report issued in connection with PCT/US2013/033261 mailed Jun. 14, 2013 (3 pages).

International Search Report issued in connection with PCT/US2013/33265 mailed Jul. 9, 2013 (2 pages).

Ioannis Ntzoufras "Bayesian Modeling Using Winbugs An Introduction", Department of Statistics, Athens University of Economics and Business, Wiley-Interscience, A John Wiley & Sons, Inc., Publication, Chapter 5, Jan. 1, 2007, pp. 155-220 (67 pages).

Japanese Office Action issued by the Japan Patent Office for Application No. 2015-503396 dated Jun. 29, 2016 (7 pages).

Japanese Office Action issued by the Japan Patent Office for Japanese Application No. 2016-159338 dated Oct. 11, 2017 (12 pages).

Japanese Office Action issued by the Japanese Patent Office for Japanese Application No. 2016-159338 dated Oct. 11, 2017 (12 pages).

Japanese Office Action issued by the Japanese Patent Office for Japanese Application No. 2016-189126 dated Oct. 19, 2017 (24 pages).

(56) References Cited

OTHER PUBLICATIONS

Koole, G. (2004). "Performance Analysis and Optimization in Customer Contact Centers," Proceedings of the Quantitative Evaluation of Systems, First International Conference, Sep. 27- 30, 2004 (4 pages).

Koole, G. et al. (Mar. 6, 2006). "An Overview of Routing and Staffing Algorithms in Multi-Skill Customer Contact Centers," Manuscript, 42 pages.

Nocedal, J. and Wright, S. J., "Numerical Optimization," Chapter 16 Quadratic Programming, pp. 448-496 (2006) 50 pages.

Notice of Reasons for Rejection issued by the Japan Patent Office for Japanese Application No. 2018-528305 dated Oct. 17, 2018 (6 pages).

Notice of Reasons for Rejection issued by the Japan Patent Office for Japanese Application No. 2018-528314 dated Oct. 17, 2018 (5 pages).

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Subsequent Substantive Examination Report issued in connection with Philippines Application No. 1-2010-501705 mailed Jul. 14, 2014 (1 page).

Substantive Examination Report issued in connection with Philippines Application No. 1/2011/500868 dated May 2, 2014 (1 page).

Written Opinion of the International Searching Authority issued in connection with International Application No. PCT/US13/33268 mailed May 31, 2013, 7 pages.

Written Opinion of the International Searching Authority issued in connection with PCT Application No. PCT/US/2009/054352 mailed Mar. 12, 2010, 5 pages.

Written Opinion of the International Searching Authority issued in connection with PCT Application No. PCT/US2008/077042 mailed Mar. 13, 2009, 6 pages.

Written Opinion of the International Searching Authority issued in connection with PCT Application No. PCT/US2009/031611 mailed Jun. 3, 2009, 7 pages.

Written Opinion of the International Searching Authority issued in connection with PCT Application No. PCT/US2009/066254 mailed Feb. 24, 2010, 5 pages.

Written Opinion of the International Searching Authority issued in connection with PCT Application No. PCT/US2009/066254 mailed Feb. 4, 2010, 5 pages.

Written Opinion of the International Searching Authority issued in connection with PCT/US2009/061537 mailed Jun. 7, 2010, 10 pages.

Written Opinion of the International Searching Authority issued in connection with PCT/US2013/033261 mailed Jun. 14, 2013, 7 pages.

Written Opinion of the International Searching Authority issued in connection with PCT/US2013/33265 mailed Jul. 9, 2013, 7 pages.

* cited by examiner

Agent Transition Table 200

| | 201 | 202 | 203 | 204 | 205 |
|---|---|---|---|---|---|
| Alice | ▨ | | ▨ | | |
| Bob | | | | ▨ | ▨ |
| Charlie | | ▨ | | | ▨ |
| Donna | | ▨ | | ▨ | |

▨ Agent Not Available at Transition
☐ Agent Available at Transition

FIG. 2

Agent Transition Table 300

| | 301 | 302 | 303 | 304 | 305 |
|---|---|---|---|---|---|
| Alice | ▨ | ▨ | ▨ | ▨ | ▨ |
| Bob | ▨ | | | ▨ | |
| Charlie | ▨ | ▨ | | ▨ | |
| Donna | | | | | |

▨ Agent Not Available at Transition

☐ Agent Available at Transition

FIG. 3

TECHNIQUES FOR BENCHMARKING PERFORMANCE IN A CONTACT CENTER SYSTEM

CROSS-REFERENCE TO RELATED APPLICATIONS

This patent application is a continuation of U.S. patent application Ser. No. 17/745,217, filed on May 16, 2022, which is a continuation of U.S. patent application Ser. No. 17/525,468, filed on Nov. 12, 2021, now U.S. Pat. No. 11,363,142, which is a continuation of U.S. patent application Ser. No. 17/093,076, filed on Nov. 9, 2020, now U.S. Pat. No. 11,356,556, which is a continuation of U.S. patent application Ser. No. 16/198,419, filed on Nov. 21, 2018, now U.S. Pat. No. 10,834,259, which is a continuation of U.S. patent application Ser. No. 15/176,899, filed Jun. 8, 2016, now U.S. Pat. No. 10,142,473, each of which is hereby incorporated by reference herein in its entirety.

FIELD OF THE DISCLOSURE

This disclosure generally relates to contact centers and, more particularly, to techniques for benchmarking performance in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on the time when those agents became available, and agents are assigned to contacts ordered based on time of arrival. This strategy may be referred to as a "first-in, first-out", "FIFO", or "round-robin" strategy.

Some contact centers may use a "performance based routing" or "PBR" approach to ordering the queue of available agents or, occasionally, contacts. PBR ordering strategies attempt to maximize the expected outcome of each contact-agent interaction but do so typically without regard for uniformly utilizing agents in a contact center.

When a contact center changes from using one type of pairing strategy (e.g., FIFO) to another type of pairing strategy (e.g., PBR), some agents may be available to receive a contact, while other agents may be on a call. If the average agent performance over time is unbalanced, the overall performance of one type of pairing strategy may be unfairly influenced by the other type of pairing strategy.

In view of the foregoing, it may be understood that there may be a need for a system that enables benchmarking contact center system performance including transition management of alternative routing strategies to detect and account for unbalanced average agent performance among alternative pairing strategies.

SUMMARY OF THE DISCLOSURE

Techniques for benchmarking performance in a contact center system are disclosed. In one particular embodiment, the techniques may be realized as a method for benchmarking contact center system performance comprising cycling, by at least one computer processor configured to perform contact center operations, between a first contact-agent pairing strategy and a second contact-agent pairing strategy for pairing contacts with agents in the contact center system, determining, by the at least one computer processor, an agent-utilization bias in the first contact-agent pairing strategy comprising a difference between a first agent utilization of the first contact-agent pairing strategy and a balanced agent utilization, and determining, by the at least one computer processor, a relative performance of the second contact-agent pairing strategy compared to the first contact-agent pairing strategy based on the agent-utilization bias in the first contact-agent pairing strategy.

In accordance with other aspects of this particular embodiment, the method may further include adjusting, by the at least one computer processor, a target agent utilization of the second contact-agent pairing strategy to reduce the agent-utilization bias in the first contact-agent pairing strategy.

In accordance with other aspects of this particular embodiment, the method may further include determining, by the at least one computer processor, an average available-agent performance of a plurality of agents during at least one transition from the first contact-agent pairing strategy to the second contact-agent pairing strategy.

In accordance with other aspects of this particular embodiment, the method may further include determining, by the at least one computer processor, an average availability of at least one of a plurality of agents during at least one transition from the first contact-agent pairing strategy to the second contact-agent pairing strategy.

In accordance with other aspects of this particular embodiment, the method may further include outputting, by the at least one computer processor, a transition management report comprising the agent-utilization bias of the first contact-agent pairing strategy.

In accordance with other aspects of this particular embodiment, the first contact-agent pairing strategy may be a performance-based routing strategy.

In accordance with other aspects of this particular embodiment, the second contact-agent pairing strategy may be a behavioral pairing strategy.

In accordance with other aspects of this particular embodiment, the second contact-agent pairing strategy may be a hybrid behavioral pairing strategy, and the hybrid behavioral pairing strategy may be biased toward a performance-based routing strategy.

In accordance with other aspects of this particular embodiment, the method may further include adjusting, by the at least one computer processor, at least one parameter of the second contact-agent pairing strategy.

In accordance with other aspects of this particular embodiment, the at least one parameter comprises a Kappa parameter for a hybrid behavioral pairing strategy.

In accordance with other aspects of this particular embodiment, the first contact-agent pairing strategy may target an unbalanced agent utilization, and the second contact-agent pairing strategy may target the balanced agent utilization.

In accordance with other aspects of this particular embodiment, the target utilization of the second contact-agent pairing strategy may be adjusted at least once at one or more points in time between a transition from the first to the second contact-agent pairing strategy and a subsequent transition from the second to the first contact-agent pairing strategy.

In another particular embodiment, the techniques may be realized as a system for benchmarking performance in a contact center system comprising at least one processor, wherein the at least one processor is configured to perform the above-described method.

In another particular embodiment, the techniques may be realized as an article of manufacture for benchmarking performance in a contact center system comprising: a non-transitory processor readable medium; and instructions stored on the medium; wherein the instructions are configured to be readable from the medium by at least one processor and thereby cause the at least one processor to operate so as to perform the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 2 shows a schematic representation of an agent transition table according to embodiments of the present disclosure.

FIG. 3 shows a schematic representation of an agent transition table according to embodiments of the present disclosure.

DETAILED DESCRIPTION

Figure 1:
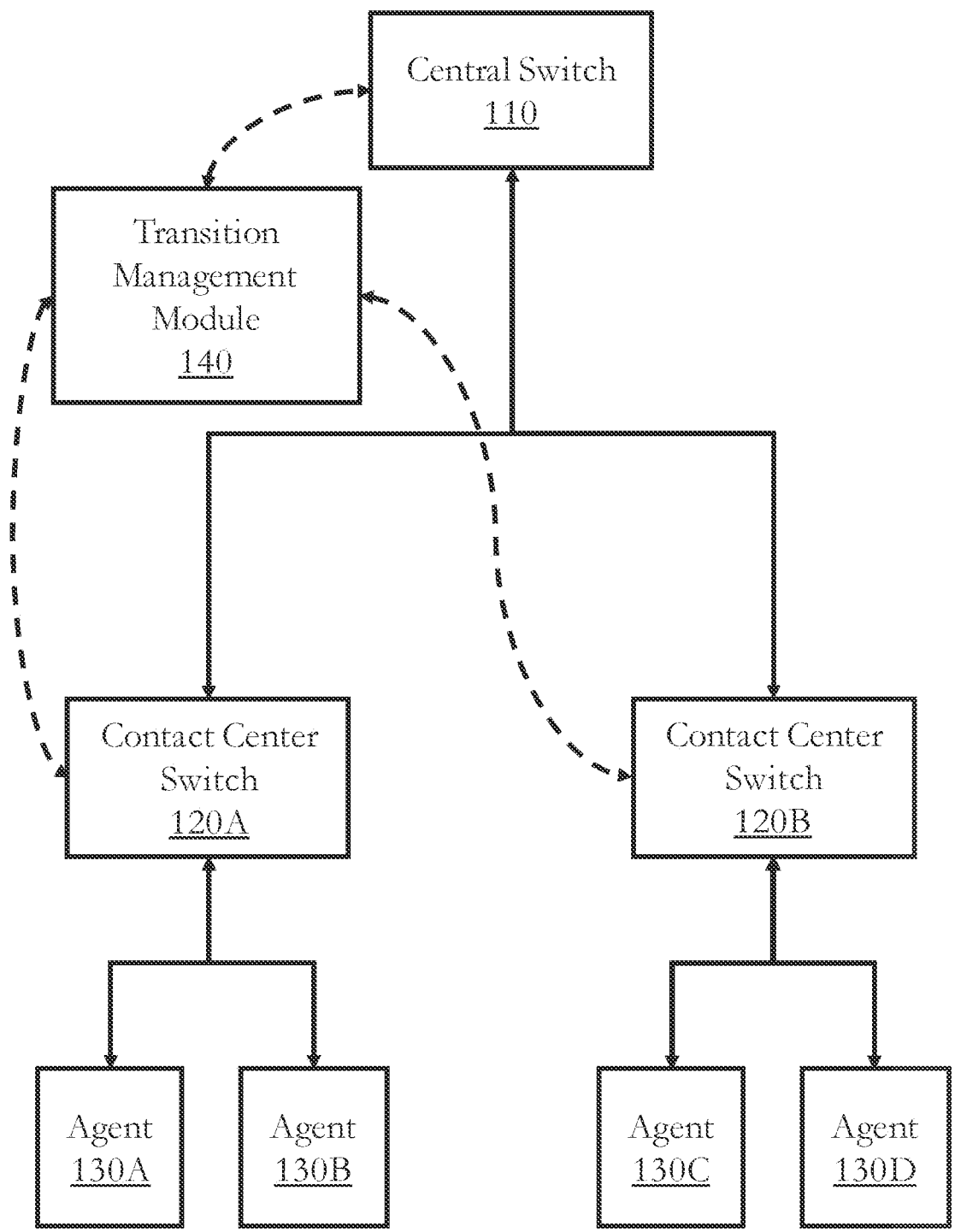
FIG. 1 shows a block diagram of a contact center system according to embodiments of the present disclosure.

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on the time when those agents became available, and agents are assigned to contacts ordered based on time of arrival. This strategy may be referred to as a "first-in, first-out", "FIFO", or "round-robin" strategy. For example, a longest-available agent pairing strategy preferably selects the available agent who has been available for the longest time.

Some contact centers may use a "performance based routing" or "PBR" approach to ordering the queue of available agents or, occasionally, contacts. PBR ordering strategies attempt to maximize the expected outcome of each contact-agent interaction but do so typically without regard for uniformly utilizing agents in a contact center. Some variants of PBR may include a highest-performing-agent pairing strategy, preferably selecting the available agent with the highest performance, or a highest-performing-agent-for-contact-type pairing strategy, preferably selecting the available agent with the highest performance for the type of contact being paired.

For yet another example, some contact centers may use a "behavioral pairing" or "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and PBR strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SAT-MAP", "routing system", "routing engine", etc.) is described in, for example, U.S. Pat. No. 8,879,715, which is incorporated by reference herein.

In some embodiments, a contact center may switch (or "cycle") periodically among at least two different pairing strategies (e.g., between FIFO and PBR; between PBR and BP; among FIFO, PBR, and BP). Additionally, the outcome of each contact-agent interaction may be recorded along with an identification of which pairing strategy (e.g., FIFO, PBR, or BP) had been used to assign that particular contact-agent pair. By tracking which interactions produced which results, the contact center may measure the performance attributable to a first strategy (e.g., FIFO) and the performance attributable to a second strategy (e.g., PBR). In this way, the relative performance of one strategy may be benchmarked against the other. The contact center may, over many periods of switching between different pairing strategies, more reliably attribute performance gain to one strategy or the other. Additional information about these and other features regarding benchmarking pairing strategies is described in, for example, U.S. patent application Ser. No. 15/131,915, filed Apr. 20, 2016.

When a contact center changes from using one type of pairing strategy (e.g., PBR) to another type of pairing strategy (e.g., BP), some agents may be available to receive a contact, while other agents may be interacting with a contact (e.g., on a call). If the average agent performance at transitions over time is unbalanced, the overall performance of one type of pairing strategy may be unfairly influenced by the other type of pairing strategy. For example, when a contact center pairs contacts and agents using PBR, high-performing agents are more likely to be busy interacting with a contact, while low-performing agents are more likely to be idle. Thus, at transitions from PBR to another pairing strategy such as BP, the average performance of available agents at transitions over time is likely to be below the average performance of all of the agents including both the available agents and the busy agents.

FIG. 1 shows a block diagram of a contact center system according to embodiments of the present disclosure. As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components within a contact center.

The central switch 110 may not be necessary if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, transition management module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple benchmarking modules. In some embodiments, transition management module 140 may be embedded within a component of a contact center system (e.g., embedded in or otherwise integrated with a switch). The transition management module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of transition management module 140 or one or more switches such as central switch 110 or contact center switches 120A and 120B. In some embodiments, a transition management module 140 may determine which pairing module may handle pairing for a particular contact. For example, the transition management module 140 may alternate between enabling pairing via the BP module and enabling pairing with the FIFO module. In other embodiments, one pairing module (e.g., the BP module) may be configured to emulate other pairing strategies. For example, a transition management module 140, or a transition management component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Embodiments of the present disclosure are not limited to benchmarking transition management of only two pairing strategies. Instead, benchmarking transition management may be performed for two or more pairing strategies (e.g., benchmarking transition management of FIFO, PBR, and BP).

FIG. 2 shows a schematic representation of an agent transition table 200 according to embodiments of the present disclosure. In the example of FIG. 2, four agents named "Alice", "Bob", "Charlie", and "Donna" may be assigned to a particular queue for interacting with contacts. These agent names are for illustrative purposes only; in some embodiments, anonymized identification numbers or other identifiers may be used to represent agents in a contact center. Additionally, this highly simplified example only shows four agents. In some embodiments, hundreds of agents, thousands of agents, or more may be assigned to a queue and may be depicted in an agent transition table.

Agent transition table 200 shows five transitions labeled "201", "202", "203", "204", and "205". In some embodiments, each transition may represent a point in time at which a contact center switches from one pairing strategy (e.g., FIFO) to another pairing strategy (e.g., BP). Transitions may occur multiple times per hour (e.g., every 10 minutes, every 15 minutes, every 30 minutes) or more or less frequently throughout a day, week, month, year, etc. In some embodiments, transitions may be identified by the time of day at which the transition occurred. For example, transition 201 may have occurred at time 9:15 AM, transition 202 may have occurred at time 9:45 AM, etc.

At transition 201, agents Alice and Bob are not available, as indicated by shaded cells. For example, Alice and Bob may be interacting with a contact, or they may be otherwise occupied with a post-interaction task such as logging a sale or filing a customer service report. Meanwhile, agents Charlie and Donna are idle or otherwise available to be connected to a contact, as indicated by unshaded cells.

Similarly, at transition 202, agents Charlie and Donna are busy, and agents Alice and Bob are available. At transition 203, agents Alice and Charlie are busy, and agents Bob and Donna are available. At transition 204, agents Bob and Donna are busy, and agents Alice and Charlie are available. At transition 205, agents Bob and Charlie are busy, and agents Alice and Donna are available.

At any single transition, even pairing strategies that target balanced agent utilization (e.g., FIFO and BP, but not PBR) may appear to have skewed utilization at transitions. For example, if Alice has a normalized performance rating of 80, Bob a rating of 60, Charlie a rating of 40, and Donna a rating of 20, the average performance of all agents is 50. However, the average performance of the available agents at transition 201 (i.e., Charlie and Donna) is below average at 30. The average performance of the available agents at transition 202 is above average at 70. The average performance of the available agents at transition 203 is below average at 40. The average performance of the available agents at transition 204 is above average at 60.

At some transitions, even pairing strategies that target unbalanced agent utilization (e.g., PBR) may appear to have balanced utilization at transitions. For example, at transition 205, the average performance of the available agents (i.e., Alice and Donna) is 50.

Despite variance in average performance of available agents at any single transition, the average performance of available agents at multiple transitions over time (e.g., over the course of a day) may reflect the statistically expected utilization of a given pairing strategy. Agent transition table 200 shows five transitions 201-205, which, in some embodiments, may not be a statistically significant number of transitions. Nevertheless, for illustrative purposes, the average available agent performance over the course of the five transitions 201-205 is (30+70+40+60+50)/5=50. In this example, the average available agent performance at the transitions over the course of five transitions 201-205 was balanced.

In some embodiments, in addition to or instead of determining the average performance of available agents over one or more transitions, the average availability of individual agents may also be determined and outputted. For example, in agent transition table 200, the average availability of each agent over each transition 201-205 is 60% for Alice (3 of 5 transitions), 40% for Bob (2 of 5 transitions), 40% for Charlie (2 of 5 transitions), and 60% for Donna (4 of 5 transitions). For pairing strategies that target balanced agent utilization (e.g., FIFO or BP), it may be statistically likely for each agent to be available approximately the same number of times or same proportion of transitions. In this simplified example, which depicts only five transitions 201-205, the average availability of each agent varies between 40% and 60%. However, over time, the average availability of each agent may be statistically likely to converge to the same percentage. For example, after 100 transitions, the average availability of every agent may approximately the same, e.g., 50%, 55%, 60%, etc.

FIG. 3 shows a schematic representation of an agent transition table 300 according to embodiments of the present disclosure. In contrast to the example of agent transition table 200 (FIG. 2), agent transition table 300 shows outcomes that would typically be expected in a contact center using an unbalanced pairing strategy such as PBR. In some embodiments of PBR, the highest-performing agent (i.e., Alice) may be preferably selected to interact with contacts. Consequently, Alice is never available at any of the transitions 301-305. Meanwhile, the lowest-performing agent (i.e., Donna) is always available at each of the transitions 301-305.

The average performance of available agents is 30 at transition 301, 40 at transition 302, 30 at transition 303, 20 at transition 304, and 40 at transition 305. The average performance of available agents over the course of five transitions 301-305 is unbalanced at (30+40+30+20+40)/5=32. The extent to which the average performance of available agents over time may show a statistically significant amount of skew in agent utilization that could "pollute", bias, or otherwise influence the effectiveness of alternative pairing strategies following each transition, resulting in potentially unfair benchmarking measurements.

In some embodiments, in addition to or instead of determining the average performance of available agents over one or more transitions, the average availability of individual agents may also be determined and outputted. For example, in agent transition table 300, the average availability of each agent over each transition 301-305 is 0% for Alice (0 of 5 transitions), 40% for Bob (2 of 5 transitions), 60% for Charlie (3 of 5 transitions), and 100% for Donna (5 of 5 transitions). For pairing strategies that target unbalanced agent utilization (e.g., PBR), it may be statistically likely for some agents (e.g., lower-performing agents) to be available significantly more often than other agents (e.g., higher-performing agents). Even in this simplified example, which depicts only five transitions 501-505, the average availability of each agent varies significantly between 0% and 100%. Over time, the statistical significance of the varying average availability of each agent may be further confirmed. Here, an unbalanced pairing strategy such as PBR always or almost always hands off lower-performing agents to the next pairing strategy (e.g., BP or FIFO), while the higher-performing agents are never or almost never handed off. As explained above in reference to average agent quality at one or more transitions, the extent to which the average availability of agents over time may show a statistically significant amount of skew in agent utilization that could "pollute", bias, or otherwise influence the effectiveness of alternative pairing strategies following each transition, resulting in potentially unfair benchmarking measurements.

Figure 4:
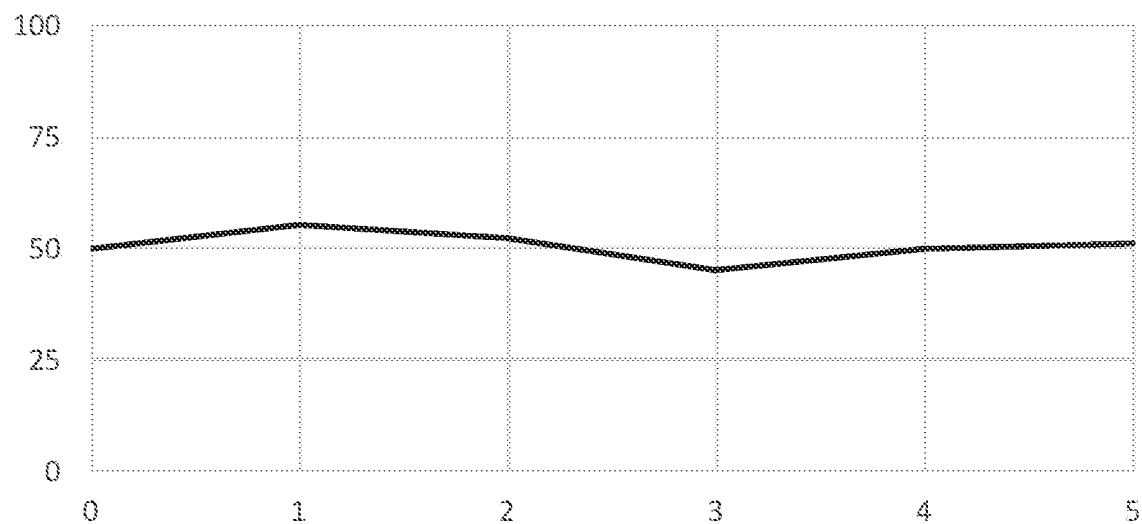
FIG. 4 depicts a schematic representation of an agent transition chart according to embodiments of the present disclosure.

FIG. 4 depicts a schematic representation of an agent transition chart 400 according to embodiments of the present disclosure. In agent transition chart 400, the x-axis indicates a period of time. For example, x=0 may represent a first day, x=1 a second day, etc. over the course of a week. The y-axis indicates the average performance of available agents over all of the transitions from a first pairing strategy to a second pairing strategy during a given time period. For example, at x=0 (e.g., Day 1), the average performance of available agents at transitions over the course of the day was 50. At x=1 (e.g., Day 2), the average performance was slightly above average, and at x=3 (e.g., Day 4), the average performance was slightly below average. Nevertheless, the agent transition chart 400 shows a relatively steady average performance over relatively longer time periods (e.g., a week). In some embodiments, the small amount of variability from day to day may be statistically insignificant, and the overall agent utilization for this first pairing strategy is balanced.

Figure 5:
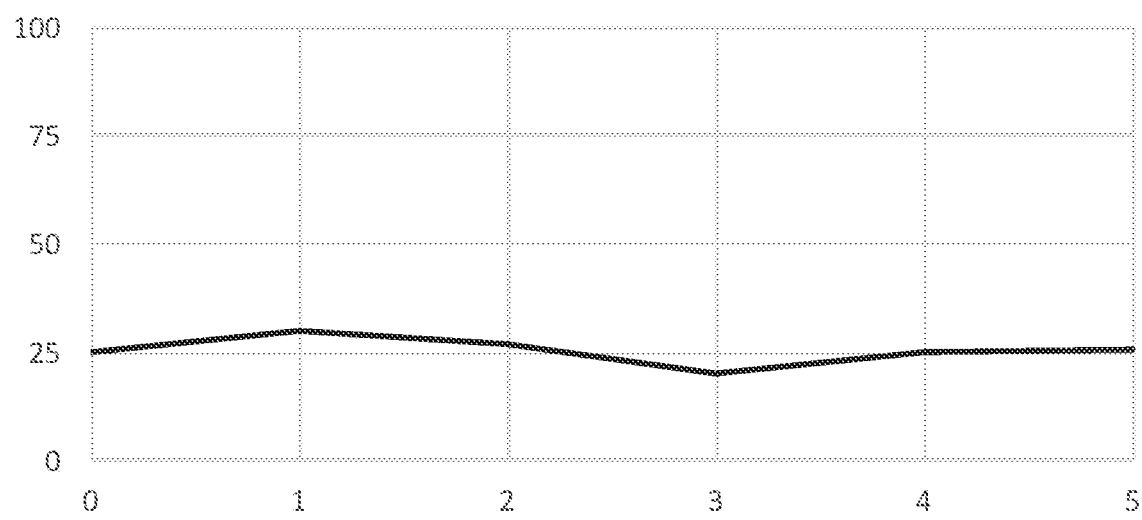
FIG. 5 depicts a schematic representation of an agent transition chart according to embodiments of the present disclosure.

FIG. 5 depicts a schematic representation of an agent transition chart 500 according to embodiments of the present disclosure. In agent transition chart 500, the overall agent utilization remains steady at about 25 from day to day, which is significantly below average. Thus, the overall agent utilization for this pairing strategy (e.g., PBR) is unbalanced.

When benchmarking among multiple pairing strategies, it is possible for a first pairing strategy (e.g., PBR) to "pollute" or otherwise bias the performance of a second pairing strategy (e.g., FIFO or BP). At each transition from PBR to BP, the average performance of available agents may be significantly below the overall average performance of all agents assigned to the queue (i.e., unbalanced). This "suppressed" agent pool at the beginning of a BP or FIFO cycle may weaken the overall performance of BP or FIFO for that cycle.

Conversely, at each transition from BP or FIFO to PBR, the average performance of available agents may be similar or equal to the overall average performance of all agents assigned to the queue (i.e., balanced). This balanced agent pool at the beginning of each PBR cycle may enhance the overall performance of PBR for that cycle, because even a balanced agent pool may be better than the typical agent pool that PBR causes.

Because each PBR cycle may leave the agent pool more "polluted" (unbalanced) than when it received it, and each BP or FIFO cycle may leave the agent pool "cleaner" (balanced) than when it received it, some techniques for benchmarking PBR against BP or FIFO may give the appearance that BP or FIFO are performing worse than they otherwise would be if the PBR cycles were not polluting their available agent pools at the beginning of each cycle. Thus, it may be helpful to compare the average performance of available agents at the beginning ("front half") of a cycle with the average performance of available agents at the end ("back half") of the cycle.

Figure 6:
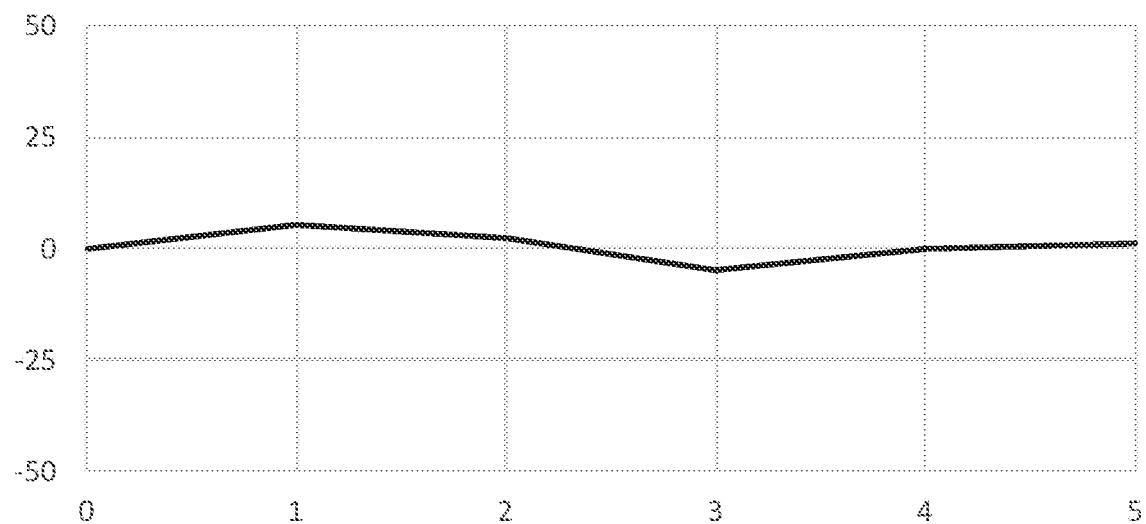
FIG. 6 shows a schematic representation of an agent transition chart according to embodiments of the present disclosure.

FIG. 6 shows a schematic representation of an agent transition chart 600 according to embodiments of the present disclosure. Agent transition chart 600 shows an example front-half/back-half comparison. At x=0 (e.g., Day 1), the difference between the average performance of available agents transitioning into a first pairing strategy and out of the first pairing strategy over the course of the day was 0. At x=1, the difference was slightly above 0, and at x=3 the difference was slightly below 0, but the overall differences over the course of a week stayed close to 0. Conceptually, the pairing strategies were leaving each other agent pools that were approximately the same average performance (e.g., quality).

An average difference of 0 does not necessarily imply that both pairing strategies are balanced (e.g., average performance of available agents of approximately 50). For example, if the first pairing strategy is PBR_A with an average available agent performance of 25, and the second pairing strategy is PBR_B with an average available agent performance of 25, the difference will still be 0. From a benchmarking perspective, it may be acceptable for both pairing strategies to be unbalanced if the extent to which each is unbalanced is approximately the same. In this way, each pairing strategy leaves an agent pool approximately as badly as it found it, and neither pairing strategy is polluting the other.

Figure 7:
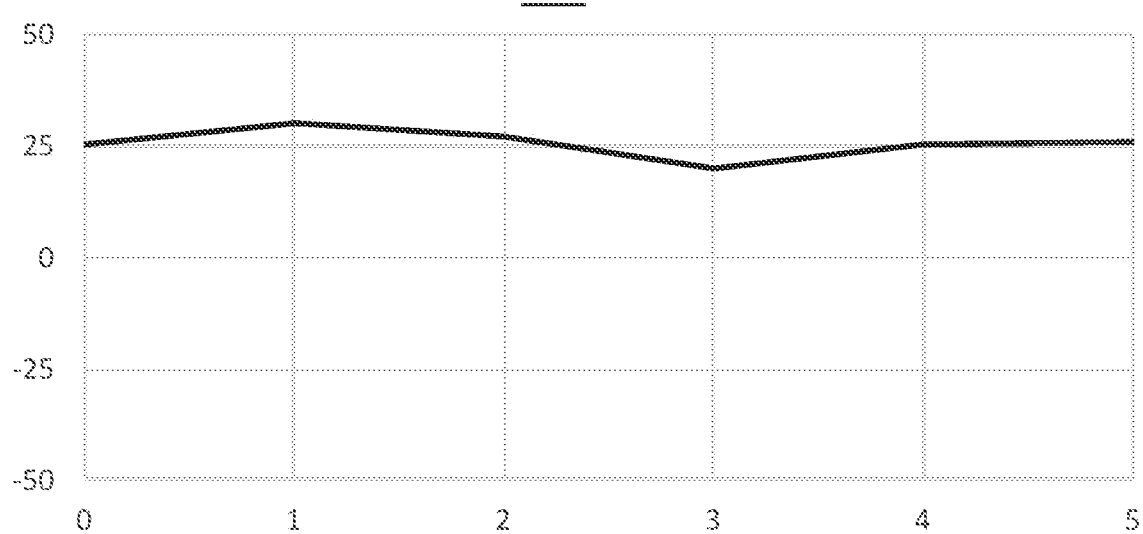
FIG. 7 shows a schematic representation of an agent transition chart according to embodiments of the present disclosure.

FIG. 7 shows a schematic representation of an agent transition chart 700 according to embodiments of the present disclosure. Agent transition charge 700 shows another example of a front-half/back-half comparison. At x=0 (e.g., Day 1), the difference between the average performance of available agents transitioning into a first pairing strategy and out of the first pairing strategy over the course of the day was 25. At x=1, the difference was slightly above 25, and at x=3 the difference was slightly below 25, but the overall differences over the course of a week stayed close to 25. Conceptually, one of the pairing strategies is consistently and significantly polluting the agent pools of another pairing strategy during its transitions. For example, if the front-half of a PBR strategy is consistently receiving an agent pool with average performance of 50, and the back-half of the PBR strategy is consistently providing an agent pool with average performance of only 25, the difference is 25 on average.

An average difference significantly above 25 does not necessarily imply that either of the pairing strategies is balanced (e.g., average performance of available agents of approximately 50). For example, if the first pairing strategy is PBR_A with an average available agent performance of 25, and the second pairing strategy is PBR_B with an average available agent performance of 0, the difference will still be 25. The PBR_B pairing strategy is still polluting the benchmark, causing PBR_A to perform worse than it would in the absence of cycling with PBR_B, and causing PBR_B to perform better than it would in the absence of cycling with PBR_A.

Figure 8:
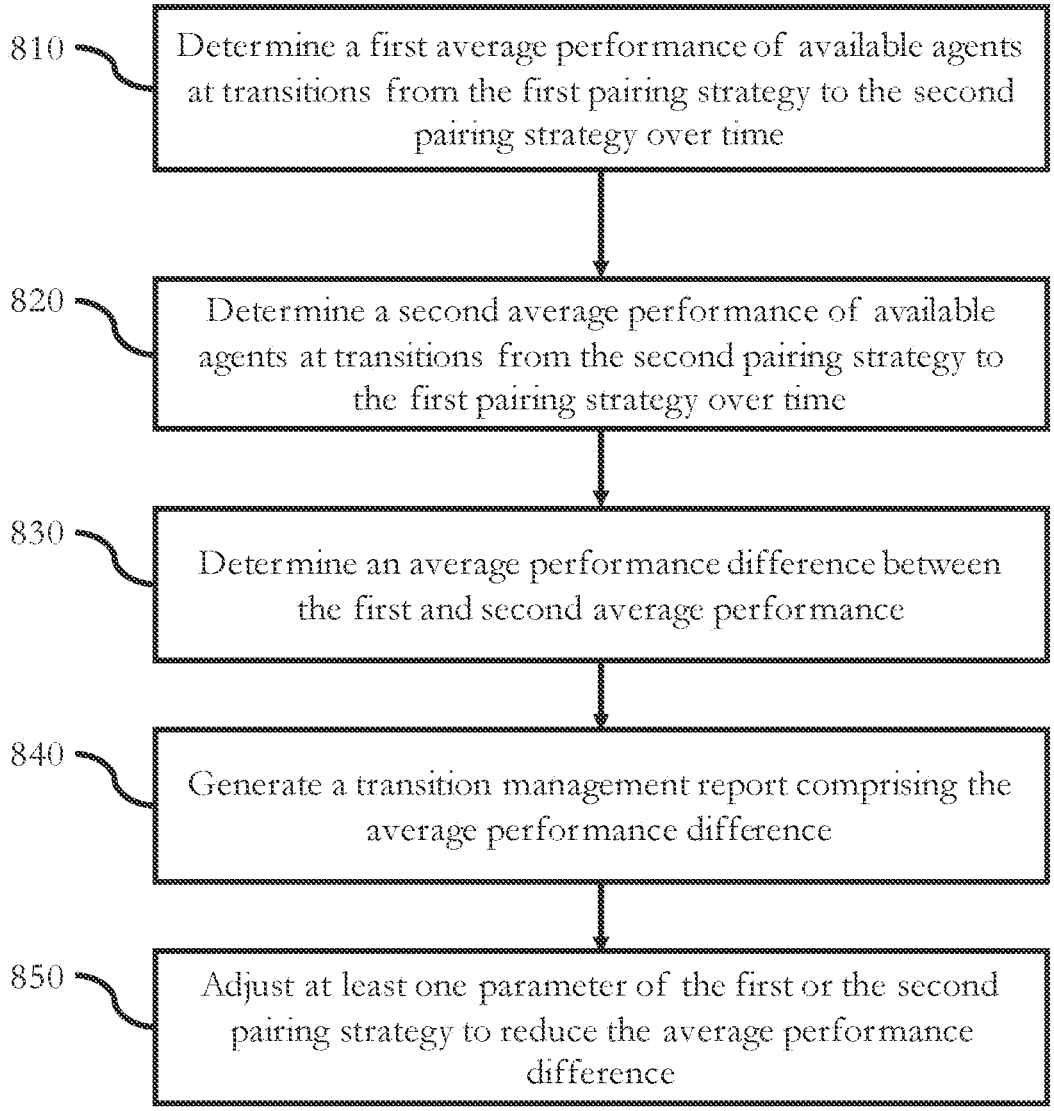
FIG. 8 shows a flow diagram of a benchmarking transition management method according to embodiments of the present disclosure.

FIG. 8 shows a flow diagram of a benchmarking transition management method 800 according to embodiments of the present disclosure. At block 810, benchmarking transition management method 800 may begin. A contact center system may be cycling among at least two pairing strategies. For example, the contact center system may be switching between BP and PBR pairing strategies. At each transition from BP to PBR and vice versa, the agents available at each transition may be determined.

At block 810, a first average performance of available agents at transitions from the first pairing strategy (e.g., BP) to the second pairing strategy (e.g., PBR) over time may be determined, based on determinations of available agents and their relative or otherwise normalized performance for each transition. The first average performance may also be considered the "front-half" measurement of the second pairing strategy for the time period.

At block 820, in some embodiments, a second average performance of available agents at transitions from the second pairing strategy (e.g., PBR) to the first pairing strategy (e.g., BP) over time may be determined, based on determinations of available agents and their relative or otherwise normalized performance for each transition. The second average performance may also be considered the "back-half" measurement of the second pairing strategy for the time period.

At block 830, in some embodiments, an average performance difference between the first and second average performance may be determined. If the difference equals or approximates zero, it may be determined that there is no significant difference between the average performance of available agents received from or provided to the first pairing strategy during the measured time period. If the difference is greater than zero, it may be determined that the average performance of available agents provided by the first pairing strategy (e.g., BP) is higher than the average performance of available agents provided by the second pairing strategy (e.g., PBR), indicating that the second pairing strategy may be polluting the available agent pool and the benchmark.

At block 840, in some embodiments, a transition management report may be generated. In some embodiments, the transition management report may include the first average performance difference determined at block 810, the second average performance difference determined at block 820, the average performance difference determined at block 840, or any combination thereof. The data may be presented in a variety of formats, including but not limited to agent transition tables (e.g., agent transition tables 200 and 300 (FIGS. 2 and 3)) or agent transition charts (e.g., agent transition charts 400, 500, 600, and 700 (FIGS. 4-7)). The report may be dynamically generated and continuously or periodically updated. The report may include user interface elements for displaying, sorting, filtering, or otherwise selecting which data to display and how to display it. The report may be fully auditable, enabling viewers to inspect the source data for each element. For example, the report interface may include user interface elements that show a list of agent identifiers available at a given transition and their corresponding relative or normalized performance measures.

At block 850, in some embodiments, at least one parameter of the first or second pairing strategy may be adjusted to, for example, reduce the average performance difference determined at block 830. Reducing or eliminating a non-zero average performance difference may reduce or eliminate the extent to which one pairing strategy suppresses the performance or pollutes the benchmark of a second pairing strategy.

For example, in a contact center system cycling between PBR and BP, PBR is likely to suppress a configuration of BP that targets a uniform utilization of agents. A variety of techniques allow for BP to target a non-uniform utilization of agents. For example, adjusting a "Kappa" parameter may bias BP toward PBR with respect to agent utilization. Kappa is described in, e.g., U.S. patent application Ser. No. 14/956, 086, which is incorporated by reference herein.

If Kappa is sufficiently high, it may be possible to eliminate benchmark suppression or pollution (e.g., an average performance difference of zero). However, in some environments, a high Kappa value may reduce overall BP performance. In these situations, it may be desirable to compensate for PBR benchmark pollution with have a high initial Kappa value following a transition from PBR to BP, and reduce or eliminate the Kappa adjustment (e.g., Kappa reduction from 1.5 to 1.0) over the course of the first 3 minutes, 10 minutes, etc. The rate of such a "Kappa fade" may be adjusted to balance benchmark suppression from PBR with overall performance at the front-half of a BP cycle.

Similarly, it may be desirable to have a high Kappa value prior to a transition from BP to PBR, producing or increasing a Kappa adjustment (e.g., Kappa increase from 1.0 to 1.5) over the course of the last 3 minutes, 10 minutes, etc. The rate of such a "reverse Kappa fade" may be adjusted to balance benchmark suppression from PBR with overall performance at the back-half of a BP cycle.

In contact center systems that cycle between FIFO and BP, the average performance difference may normally be zero, as both FIFO and BP target balanced agent utilization. However, in some environments, it may be desirable or optimal for BP to target an unbalanced agent utilization (e.g., Kappa value greater than 1.0). If BP targets an unbalanced agent utilization, the average performance difference as compared to FIFO may be non-zero, indicating a suppressed or polluted benchmark. In these situations, it may be desirable to reduce or eliminate a Kappa adjustment (e.g., Kappa decrease from 1.5 to 1.0) over the course of the last 3 minutes, 10 minutes, etc. The rate of such a "Kappa fade" may be adjusted to reduce the average performance difference between BP and FIFO back to zero while balancing the optimization of overall BP performance. Following block 850, benchmarking transition management method 800 may end. In some embodiments, benchmarking transition management method 800 may return to block 810. In some embodiments, various steps may be optional, performed in a different order, or performed in parallel with other steps. For example, the adjustment of at least one parameter at block 850 may be optional, or it may be performed prior to, or simultaneously with, the generation of a transition management report at block 840.

At this point it should be noted that benchmarking performance in a contact center system in accordance with the present disclosure as described above may involve the processing of input data and the generation of output data to some extent. This input data processing and output data generation may be implemented in hardware or software. For example, specific electronic components may be employed in a transition management module or similar or related circuitry for implementing the functions associated with benchmarking performance in a contact center system in accordance with the present disclosure as described above. Alternatively, one or more processors operating in accordance with instructions may implement the functions associated with benchmarking performance in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a contact center system comprising:

obtaining, by at least one computer processor communicatively coupled to and configured to operate in a contact center system, a plurality of agents;

obtaining, by the at least one computer processor, a contact-agent pairing strategy for the contact center system for a time period, wherein the contact-agent pairing strategy comprises a parameter, wherein a first value of the parameter affects a likelihood of selection for pairing of each agent of the plurality of agents, wherein a larger difference in bandwidth between a higher-performing agent and a lower-performing agent corresponds to a larger bias toward skewed agent utilization;

pairing, by the at least one computer processor, during a first subset of time of the time period, contacts of a plurality of contacts to agents of the plurality of agents based on the contact-agent pairing strategy and a first value for the parameter;

determining, by the at least one computer processor, a second value for the parameter of the contact-agent pairing strategy based on an amount of remaining time in the time period after the first subset of time has elapsed; and pairing, by the at least one computer processor, during a second subset of time of the time period, contacts of the plurality of contacts to agents of the plurality of agents based on the contact-agent pairing strategy, the second value of the parameter, and a corresponding likelihood of selection for pairing of each agent of the plurality of agents.

2. The method of claim 1, wherein the contact-agent pairing strategy is a behavioral pairing (BP) strategy.

3. The method of claim 2, wherein the parameter is a Kappa parameter.

4. The method of claim 3, wherein the first value of the Kappa parameter targets an unbalanced agent utilization to compensate for benchmark pollution caused by another contact-agent pairing strategy.

5. The method of claim 3, wherein the second value of the Kappa parameter targets a balanced agent utilization after recovering from benchmark pollution caused by another contact-agent pairing strategy.

6. The method of claim 3, wherein the second value of the Kappa parameter targets an unbalanced agent utilization.

7. The method of claim 6, wherein the first value of the Kappa parameter increases a likelihood of selection for pairing higher-performing agents of the plurality of agents and decreases a likelihood of selection for pairing for lower-performing agents.

8. A system comprising:
at least one computer processor communicatively coupled to and configured to operate in a contact center system, wherein the at least one computer processor is further configured to:
 obtain a plurality of agents;
 obtain a contact-agent pairing strategy for the contact center system for a time period, wherein the contact-agent pairing strategy comprises a parameter, wherein a first value of the parameter affects a likelihood of selection for pairing of each agent of the plurality of agents, wherein a larger difference in bandwidth between a higher-performing agent and a lower-performing agent corresponds to a larger bias toward skewed agent utilization;
 pair, during a first subset of time of the time period, contacts of a plurality of contacts to agents of the plurality of agents based on the contact-agent pairing strategy and a first value for the parameter;
 determine a second value for the parameter of the contact-agent pairing strategy based on an amount of remaining time in the time period after the first subset of time has elapsed; and
 pair, during a second subset of time of the time period, contacts of the plurality of contacts to agents of the plurality of agents based on the contact-agent pairing strategy, the second value of the parameter, and a corresponding likelihood of selection for pairing of each agent of the plurality of agents.

9. The system of claim 8, wherein the contact-agent pairing strategy is a behavioral pairing (BP) strategy.

10. The system of claim 9, wherein the parameter is a Kappa parameter.

11. The system of claim 10, wherein the first value of the Kappa parameter targets an unbalanced agent utilization to compensate for benchmark pollution caused by another contact-agent pairing strategy.

12. The system of claim 10, wherein the second value of the Kappa parameter targets a balanced agent utilization after recovering from benchmark pollution caused by another contact-agent pairing strategy.

13. The system of claim 10, wherein the second value of the Kappa parameter targets an unbalanced agent utilization.

14. The system of claim 13, wherein the first value of the Kappa parameter increases a likelihood of selection for pairing higher-performing agents of the plurality of agents and decreases a likelihood of selection for pairing for lower-performing agents.

15. An article of manufacture comprising:
a non-transitory computer processor readable medium; and
instructions stored on the medium;
wherein the instructions are configured to be readable from the medium by at least one computer processor communicatively coupled to and configured to operate in a contact center system and thereby cause the at least one computer processor to operate so as to:
 obtain a plurality of agents;
 obtain a contact-agent pairing strategy for the contact center system for a time period, wherein the contact-agent pairing strategy comprises a parameter, wherein a first value of the parameter affects a likelihood of selection for pairing of each agent of the plurality of agents, wherein a larger difference in bandwidth between a higher-performing agent and a lower-performing agent corresponds to a larger bias toward skewed agent utilization;
 pair, during a first subset of time of the time period, contacts of a plurality of contacts to agents of the plurality of agents based on the contact-agent pairing strategy and a first value for the parameter;
 determine a second value for the parameter of the contact-agent pairing strategy based on an amount of remaining time in the time period after the first subset of time has elapsed; and
 pair, during a second subset of time of the time period, contacts of the plurality of contacts to agents of the plurality of agents based on the contact-agent pairing strategy, the second value of the parameter, and a corresponding likelihood of selection for pairing of each agent of the plurality of agents.

16. The article of manufacture of claim 15, wherein the contact-agent pairing strategy is a behavioral pairing (BP) strategy.

17. The article of manufacture of claim 16, wherein the parameter is a Kappa parameter.

18. The article of manufacture of claim 17, wherein the first value of the Kappa parameter targets an unbalanced agent utilization to compensate for benchmark pollution caused by another contact-agent pairing strategy.

19. The article of manufacture of claim 17, wherein the second value of the Kappa parameter targets a balanced agent utilization after recovering from benchmark pollution caused by another contact-agent pairing strategy.

20. The article of manufacture of claim 17, wherein the second value of the Kappa parameter targets an unbalanced agent utilization.

* * * * *